(12) United States Patent
Jaconi

(10) Patent No.: US 6,443,674 B1
(45) Date of Patent: Sep. 3, 2002

(54) SELF-CENTERING TWIST DRILL HAVING A MODIFIED FLAT BOTTOM SECTION AND A HELICAL CROWN POINT TIP

(75) Inventor: John Robert Jaconi, Casco, WI (US)

(73) Assignee: ICS Cutting Tools, Inc., Casco, WI (US)

( * ) Notice: Subject to any disclaimer, the term of this patent is extended or adjusted under 35 U.S.C. 154(b) by 0 days.

(21) Appl. No.: 09/575,087

(22) Filed: May 19, 2000

(51) Int. Cl.⁷ .......................... B23B 35/00; B23B 51/02
(52) U.S. Cl. ..................... 408/1 R; 408/224; 408/230
(58) Field of Search ....................... 408/211, 212, 408/224, 225, 223, 230, 227, 144; 407/119

(56) References Cited

U.S. PATENT DOCUMENTS

| | | | | |
|---|---|---|---|---|
| 2,332,295 A | * | 10/1943 | Bouchal | 408/211 |
| 2,903,922 A | * | 9/1959 | Ernst et al. | 408/230 |
| 4,556,347 A | * | 12/1985 | Barish | 408/230 |
| 4,826,368 A | * | 5/1989 | Tikal et al. | 408/230 |
| 4,898,503 A | * | 2/1990 | Barish | 408/230 |
| 4,968,193 A | | 11/1990 | Chaconas et al. | 408/211 |
| 5,273,380 A | * | 12/1993 | Musacchia | 408/230 |
| 5,288,183 A | * | 2/1994 | Chaconas et al. | 408/211 |
| 5,423,640 A | | 6/1995 | Lindblom et al. | 408/230 |
| 5,442,979 A | | 8/1995 | Hsu | 408/224 |
| 5,452,971 A | | 9/1995 | Nevills | 408/230 |
| 5,758,997 A | | 6/1998 | Mealey et al. | 408/224 |
| 5,762,538 A | * | 6/1998 | Shaffer | 451/36 |
| 5,882,152 A | * | 3/1999 | Janitzki | 408/144 |
| 6,050,754 A | | 4/2000 | Thomas | 408/230 |
| 6,056,486 A | * | 5/2000 | Colvin | 408/230 |
| 6,132,149 A | * | 10/2000 | Howarth et al. | 408/230 |
| 6,213,692 B1 | * | 4/2001 | Guehring et al. | 408/144 |
| 6,309,149 B1 | * | 10/2001 | Borschert et al. | 408/230 |

* cited by examiner

*Primary Examiner*—Daniel W. Howell
(74) *Attorney, Agent, or Firm*—Andrew A Paul

(57) ABSTRACT

A self-centering drill comprising: (a) a shank, a body, and a cutting end, all formed integrally in the drill; (b) the body interposed between the shank and the cutting end, the body having a pair of helical flutes and a corresponding pair of helical lands; (c) the cutting end including a substantially flat bottom section having primary cutting lips which are relief ground, the primary cutting lips forming a primary point angle, and a helical crown having a helical crown point tip that extends from the bottom section, the helical crown point tip having self-centering cutting lips; (d) wherein the outside edges of the bottom section are chamfered to form secondary cutting lips which are radially relieved, the secondary cutting lips forming a secondary point angle, (e) the primary point angle being greater than the secondary point angle.

19 Claims, 4 Drawing Sheets

SELF-CENTERING TWIST DRILL HAVING A MODIFIED FLAT BOTTOM SECTION AND A HELICAL CROWN POINT TIP

TECHNICAL FIELD OF THE INVENTION

The instant invention relates to a self-centering drill. More particularly, a self-centering drill having a modified flat bottom section chamfered at its outside edges and having a helical crown with a helical crown point tip, thus, forming six cutting lips. Such a drill is believed to generate smooth surface holes with excellent precision and accuracy, while substantially reducing chatter and vibration, and reducing the frequency of sharpening.

BACKGROUND OF THE INVENTION

Artisans ranging from the homeowner who dabbles at fix-it projects on the weekend to professional manufacturing operations need to drill holes into various materials, for example, to allow space for a fastener such as a bolt, or to allow for the passage of a gas, a liquid, or light. Many difficulties are encountered during drilling, especially when many holes must be drilled, and especially when they must be drilled at a high rate. For example, many conventional drills leave undesirable rough surfaces or edges in the drilled material, particularly when they lose center. Chatter and vibration of the drill may result in unevenly drilled holes. Some drills are designed to cut through only specific types of materials, and are not suitable for drilling through multi-layered or laminated materials that contain different components in the layers. Oftentimes, resin in wood when heated will cause wood chips to cling to the body of a drill, where those chips then retain even more heat and ruin the drill after just a few holes are completed. Some drills that do not cut cleanly produce undesirable burrs and either tear or splinter the material being drilled into.

The art is replete with drills; however, there exists a need for a drill that better addresses the difficulties encountered by the drilling artisan. A series of drills, commonly known as BULLET™ drills have been marketed. Versions of these bits are disclosed in U.S. Pat. No. 4,968,193, issued Nov. 6, 1990, to Chaconas et al., and U.S. Pat. No. 5,288,183, issued Feb. 22, 1994, to Chaconas et al., and U.S. Pat. No. 6,050,754, issued Apr. 18, 2000, to Thomas, all of which are assigned to Black & Decker, Inc. However, a need exists for more stable drills which can better maintain center and will drill without having to repetitively retract and reinsert the drill, and for drills with greater longevity, and with a reduced tendency to produce a disc in multi-layered or laminated materials.

Others have attempted to design self-centering drills, such as the ones disclosed in U.S. Pat. No. 5,423,640, issued Jun. 13, 1995, to Lindblom, et al., assigned to Sandvik AB, and U.S. Pat. No. 5,758,997, issued Jun. 2, 1998, to Mealey, et al., and U.S. Pat. No. 6,050,754, issued Apr. 18, 2000, to Thomas, assigned to Black & Decker, Inc., and U.S. Pat. No. 5,452,971, issued Sep. 26, 1995, to Nevills, and U.S. Pat. No. 5,442,979, issued Aug. 22, 1995, to Hsu, assigned to Greenfield, Industries, Inc. However, a need still exists for better self-centering drills which can better provide stability while substantially reducing chatter and vibration, while furthermore, being able to cut through a variety of materials, including different material layers laminated into a single product, and which still further, allows for the easy removal of chips during drilling and allows heat to dissipate, and yet still further, reduces the frequency of sharpening.

Applicant has found, surprisingly, that the above mentioned difficulties can be remedied with a self-centering drill having a modified flat bottom section chamfered at is outside edges and having a helical crown with a helical crown point tip, which thus, forms six cutting lips. This point geometry provides for improved cutting action that generates superior surface finishes with excellent drilling precision and accuracy. The design also provides for excellent stability while substantially reducing chatter and vibration. The drill is suitable for cutting through a variety of materials, even when different materials are laminated. And unlike other self-centering drills known in the art, the drill of the present invention consistently produces precisely rounded and uniform holes with no metal burr breakthrough or wood grain tears and splinters. Furthermore, the drill is able to stay sharp after many cuttings.

SUMMARY OF THE INVENTION

The present invention relates to a self-centering drill comprising: (a) a shank, a body, and a cutting end, all formed integrally in the drill; (b) the body interposed between the shank and the cutting end, the body having a pair of helical flutes and a corresponding pair of helical lands; (c) the cutting end including a substantially flat bottom section having primary cutting lips which are relief ground, the primary cutting lips forming a primary point angle, and a helical crown having a helical crown point tip that extends from the bottom section, the helical crown point tip having self-centering cutting lips; (d) wherein the outside edges of the bottom section are chamfered to form secondary cutting lips which are radially relieved, the secondary cutting lips forming a secondary point angle; (e) the primary point angle being greater than the secondary point angle. The invention further relates to methods of general drilling and counterbore drilling using the self-centering drills described above.

DETAILED DESCRIPTION OF THE INVENTION

Figure 1:
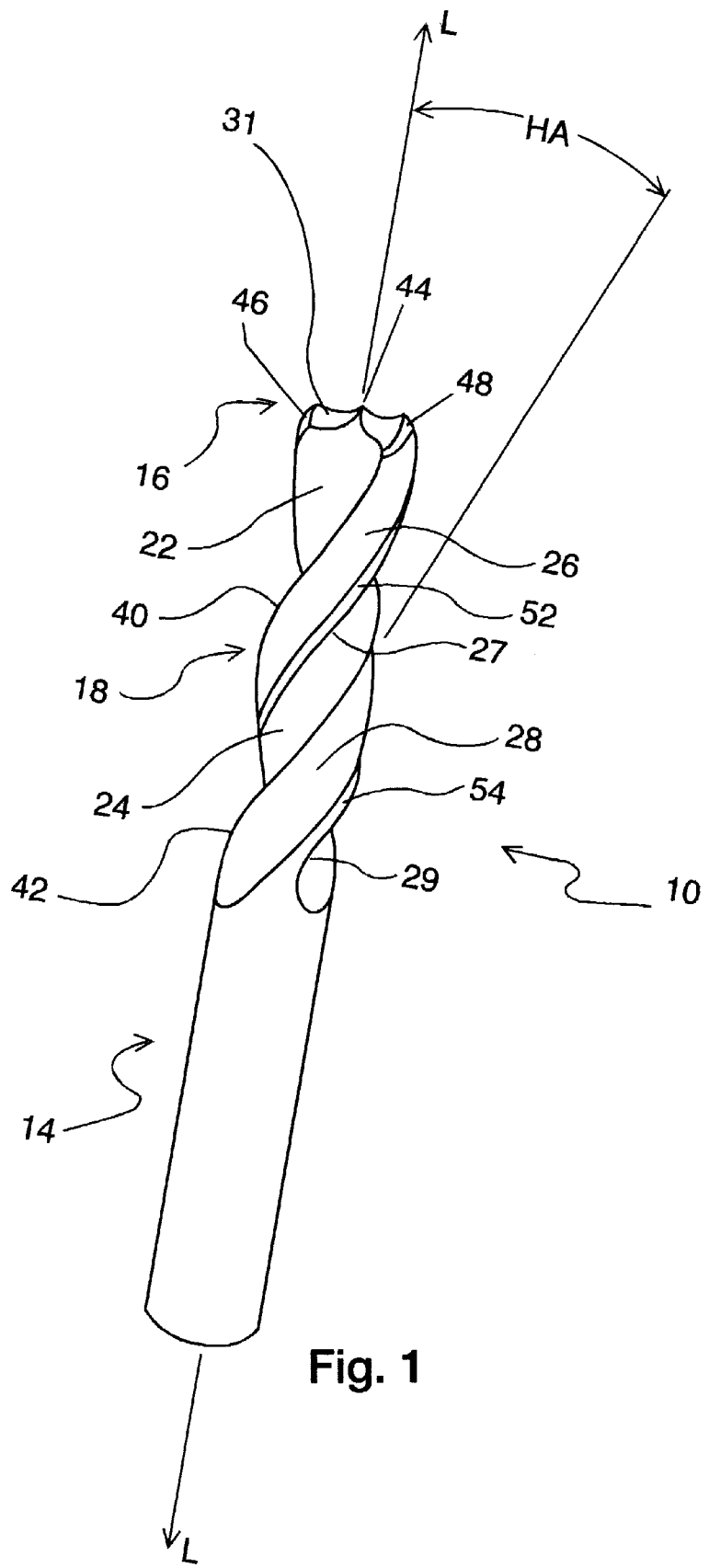
FIG. 1 is a side view showing drill 10.

The present invention relates to a self-centering drill having a modified flat bottom section chamfered at its outside edges and having a helical crown with a helical crown point tip, thus, forming six cutting lips. These features and other optional features are described in detail below.

As used herein, the term "drill" is meant to be a rotary end cutting tool having at least one cutting lip, and having at least one helical or straight flute for the passage of chips and the admission of a cutting fluid.

A. Physical Description of the Drill

The self-centering drill of the present invention includes a cutting end having a modified form of a flat-bottomed drill and a helical or spur-style point and a special edge chamfer. Together, these elements create a drill point with six individual cutting lips. The point geometry produces a unique cutting action that allows the drill to function much like a center cutting end mill. Rather than employing a customary drilling action, the drill acts more like a rigid, multi-flute boring tool. Further, the unique point geometry allows the point to stay sharp. The drill, by virtue of its general form, is ground with considerable less relief than most standard drill points.

This point geometry also offers advantages not found with other conventional or specialty point styles. Such advantages include an improved cutting action that generates superior surface finishes with excellent drilling precision and accuracy. The design also provides excellent stability while substantially reducing the chatter and vibration so common with other drill point shapes, and also reducing the frequency of sharpening. The drill combines features of metal and woodcutting drills and is well suited for drilling holes in a variety of materials. However, although the drill of the present invention is particularly well suited to drill through layers of both wood and metal, the point geometry will work equally well for drilling either material exclusively. It may be used for drilling ferrous and non-ferrous materials, natural and composite wood products, and a range of plastics similar manufactured materials, singly or in multi-layered or laminated products.

Furthermore, the point geometry consistently produces precisely round and uniform holes with no metal burr breakthrough or wood grain tears and splinters in many different wood thicknesses. The crown height of the "S"-shaped helical point provides exceptional self-centering capability and reduced thrust. The special edge chamfer forms two cutting edges to eliminate burr breakthrough.

By the nature of the basic shape and the holes various sizes of the drill produce, these drills can be used in place of many other standard drill types, as well as a few other cutting tools. For drilling wood, in addition to being used as regular drills, appropriate sizes of the drill of the present invention may be used in place of brad point drills and Forstner bits. With metal, they can be used in place of a variety of heavy duty or reduced angle point shapes. They can also replace flat bottom drills, spotfacing tools, and counterbores for some applications. The unique point geometry of the drill of the present invention also allows for simple counterbored holes for socket head cap screws, hex head screws, bolts or other hardware items by reversing the typical drilling sequence. This drill allows for drilling the counterbore diameter to the proper depth first, and then drilling the hole for the body diameter of the screw. Here, the residual point depression left after drilling the initial counterbore hole offers an accurate starting point for drilling the next hole.

The unique point geometry of the drill of the present invention may be furnished on virtually any standard twist drill body style. In addition, the drills may be manufactured in a various lengths such as standard jobbers' lengths, stub lengths, taper lengths and extended lengths, and various shank styles such as straight shanks including standard ⅜", ½" diameter straight shanks, reduced or enlarged diameter straight shanks, and the complete range of Morse taper shanks.

FIG. 1 shows a side view of drill 10 of the present invention. Drill 10 includes a longitudinal axis L—L, a hank 14, a cutting end 16 and a body 18 interposed between the shank 14 and the cutting end 16. Shank 14 extends from one end of the drill 10 to the body 18. The shank 14 may suitably be: (a) a straight shank having the same or a different diameter than the body 18 and may optionally include one or more driving flats, tangs, grooves or threads; (b) a taper shank having a conical shank suitable for direct fit into tapered holes in machine spindles, driving sleeves, sockets, etc.; (c) a taper square shank having a tapered shank with four flat sides for fitting in a ratchet or brace; (d) a threaded shank having a threaded shank such as generally used in close center multiple spindle applications or portable angle drilling tools; or (e) a beaded shank having raised beads parallel to the longitudinal axis L—L. Although shown in the figures as a right-hand cut drill bit, i.e., clockwise cutting rotation, the drill 10 may also be constructed as a left-hand cut drill bit, i.e., counterclockwise cutting rotation.

The body 18 includes a pair of helical flutes 22 and 24 that are formed at a prescribed helix angle, HA, and that begin at the inboard end of the shank 14 and extend to the cutting end 16. Typically, the prescribed helix angle, HA, ranges from about 10° to about 40°, preferably from about 15° to about 30°, more preferably from about 20° to about 30°. Helical flutes 22 and 24 comprise grooves cut or formed in the body of the drill 10 to provide cutting lips, to permit removal of chips, and/or to allow cutting fluid to reach the cutting lips. Lands 26 and 28 are the peripheral portions of the drill 10 located between corresponding helical flutes 22 and 24. Lands 26 and 28 include leading edges 27 and 29, margins 52 and 54, and trailing edges 40 and 42. Lands 26 and 28 are relieved, extending from the margins 52 and 54 to the trailing edges 40 and 42, respectively to provide clearance and prevent rubbing of the rear portion of the land against a work piece.

Figure 2:
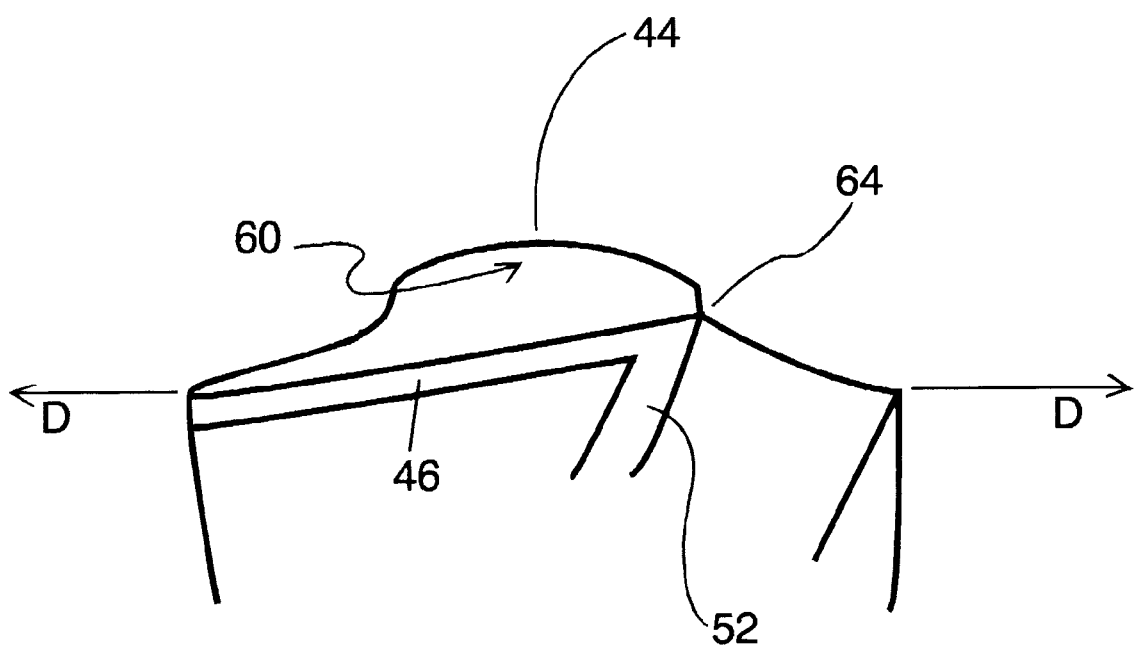
FIG. 2 is a partial side view showing the cutting end 16 of drill 10.
Figure 3:
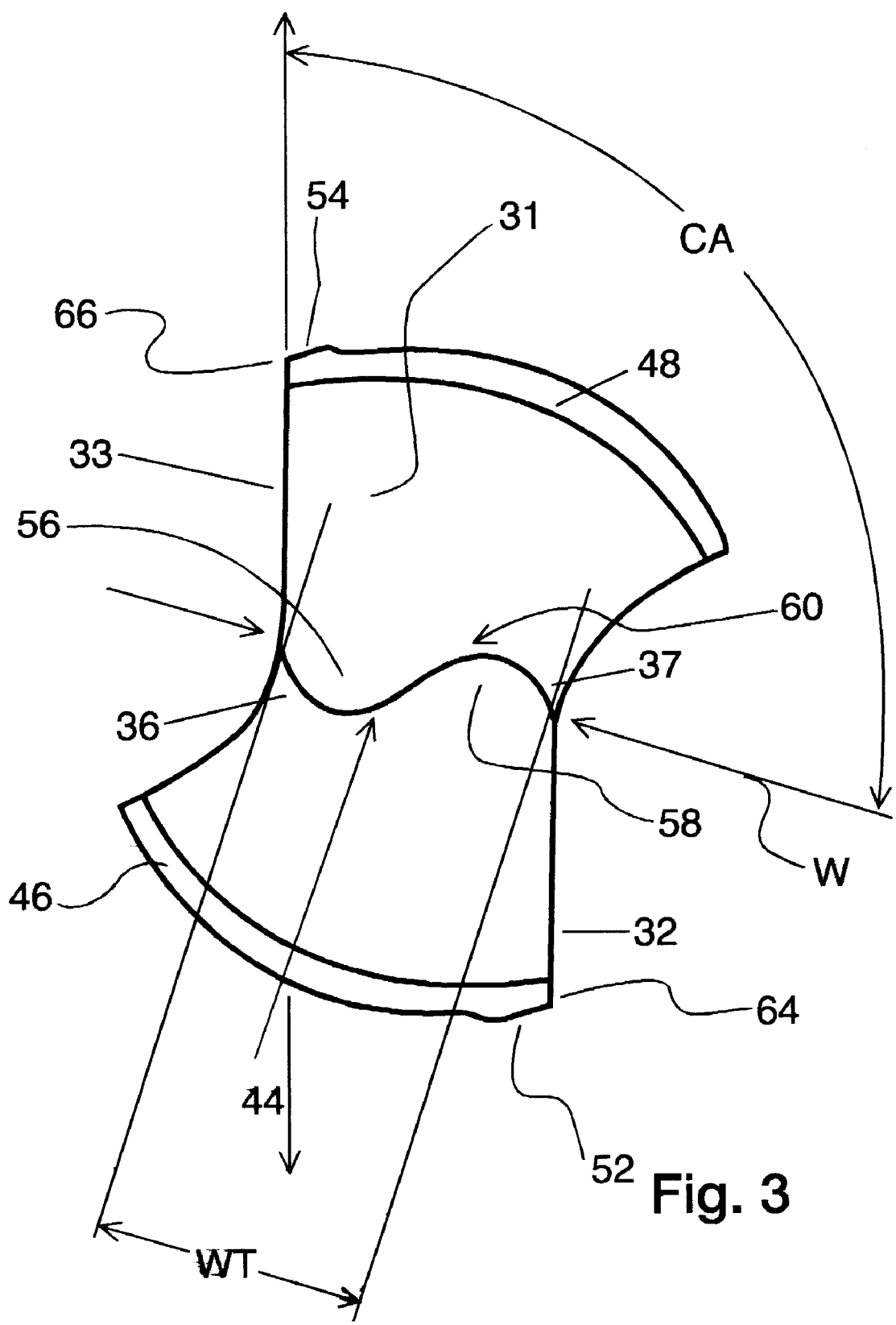
FIG. 3 is a section view taken along line D—D of FIG. 2; showing cutting end 16 of drill 10.

FIG. 2 and FIG. 3 show the cutting end 16 of the drill 10. The cutting end 16 includes a substantially flat bottom cutting section 31 and a helical crown 60, having a helical crown point tip 44. The bottom section 31 includes two primary cutting lips 32 and 33, two secondary cutting lips 64 and 66, chamfers 46 and 48, and web, W.

The primary cutting lips 32 and 33 extend from the leading edges 27 and 29 of the lands 26 and 28 inwardly along the outboard end of the helical flutes 22 and 24 towards the web, W. Chamfering the outside edges of the bottom cutting section 31 forms the secondary cutting lips 64 and 66. The secondary cutting lips 64 and 66 are preferably radially relieved to provide clearance and to prevent rubbing of the rear portion of the land against a work piece. Each of the cutting lips described above is formed with flatter relief angles that yield a substantial amount of material behind the individual cutting lips. Typically, the relief angles range from about 6° to about 18°, preferably from about 8° to about 16°. This added material helps to support the cutting lips by absorbing the cutting forces and dissipating the heat generated in drilling.

The crown point tip 44 extends beyond the flat bottom cutting section 31 and forms a pair of self-centering cutting lips 36 and 37. The crown point tip 44 is relief ground forming reliefs 56 and 58 behind the self-centering cutting lips 36 and 37 to provide clearance and to prevent rubbing of the crown point tip 44 against a work piece. The crown point tip 44 typically has a height above the bottom section 31 ranging from about ¹⁄₃₂ inches to about ³⁄₃₂ inches.

The web, W, is the central portion of the body that joins the two lands 26 and 28. The web thickness, WT, varies according to the overall diameter of drill 10, and typically ranges from about 11% to about 20% of the diameter of drill 10. The extreme end of the web at the cutting end 16 forms the chisel edge 60. Preferably, the chisel edge 60 has an "S"-shape. The chisel edge angle, CA, is shown from the major cutting lip 33 to the transverse axis on which the web, W, is defined. Typically, the chisel edge angle, CA, ranges from about 110° to about 120°, preferably from about 112° to about 118°.

Figure 4:
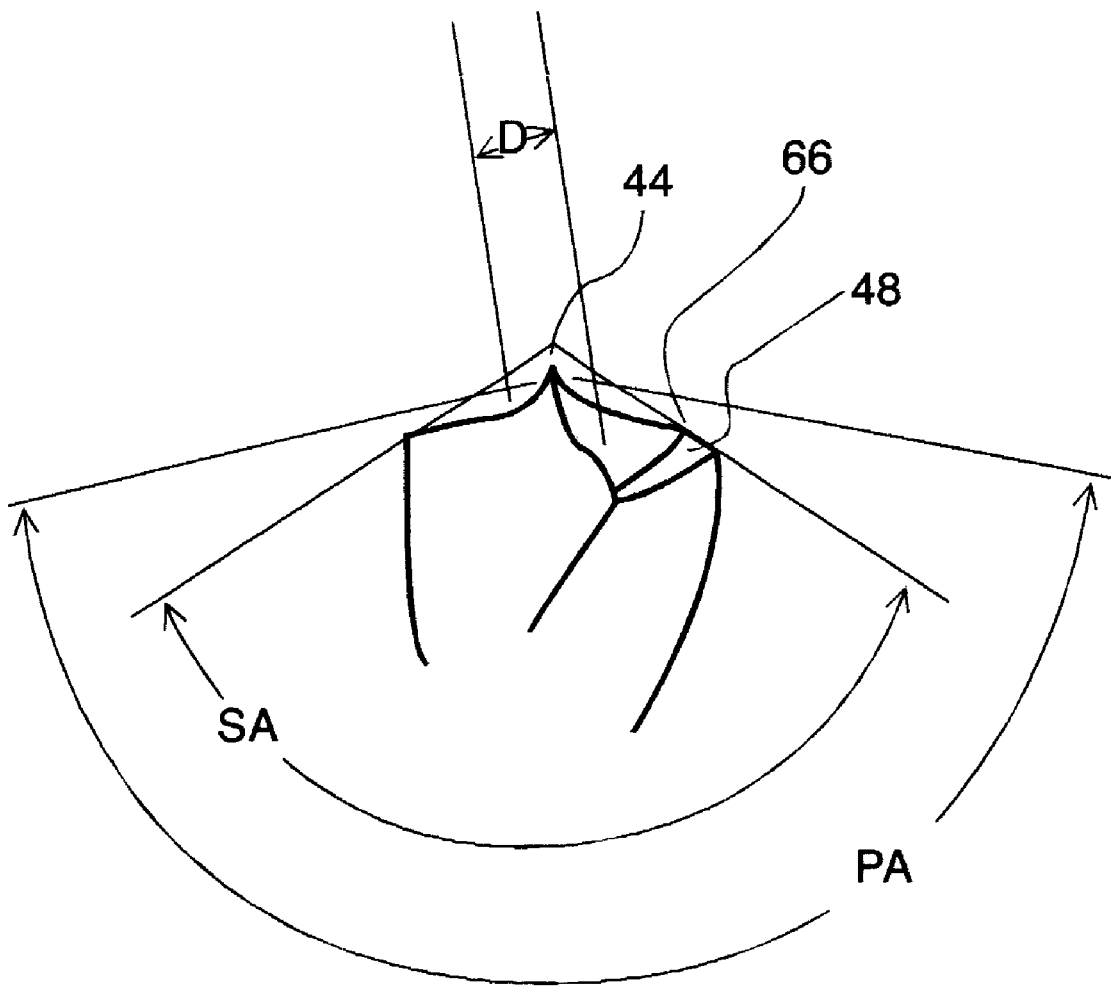
FIG. 4 is a partial side view showing the cutting end 16 of drill 10, denoting primary point angle PA and secondary point angle SA.

FIG. 4 shows a side view of cutting end 16, wherein the primary cutting lips 32 and 33 form a primary point angle, PA, and wherein secondary cutting lip 66 forms (with unseen secondary cutting lip 64) a secondary point angle, SA. The primary point angle, PA, is greater than the secondary point angle, SA. The primary point angle, PA, is preferably in the range from about 157° to about 174°, more preferably in the range from about 162° to about 172°. The secondary point angle, SA, is preferably in the range from about 90° to about 125°, more preferably in the range from about 98° to about 120°. The diameter, D, of the crown point tip 44 varies according to the overall diameter of drill 10, and is typically ranges from about 10% to about 20% of diameter D.

B. Composition of the Drill

The self-centering drill of the present invention is typically made of a steel alloy or another hard metal alloy. Non-limiting examples of alloys suitable for use herein include: carbon steel, tool steel, chrome vanadium tool steel, high speed steel, cobalt high speed steel, solid carbide, solid carbide mirograin, and mixtures thereof While not being limited by any theory, it is believed that the inclusion of particular elements into the steel alloy which comprises the drill increases the drill hardness; and/or decreases the drill's susceptibility to shock, and/or causes the drill to retain its cutting edge longer than conventional steel alloys; and/or increases the drill's ability to dissipate heat. Such elements, when present, are typically present in an amount from about 0.3% to about 35%, by weight. Non-limiting examples of elements suitable for inclusion herein include: carbon, molybdenum, chromium, vanadium, and mixtures thereof. Still other elements may be included in addition to those listed above, which when present, are typically present in an amount of from about 0.10% to about 20%, by weight. Non-limiting examples of such other elements which are suitable for use herein include: tungsten, aluminum, cobalt, and mixtures thereof.

C. Surface Treatments for the Drill

The self-centering drill of the present invention may, in some embodiments, be treated with a surface treatment. While not being limited by any theory, it is believed that surface treatments improve the performance of the drills increasing drill hardness and wear resistance; and/or reduce cutting friction and torque; and/or inhibit galling and chip welding, and/or improve lubrication. While any surface treatment known in the art may be used, some preferred surface treatments, namely finishes and coatings, are described below.

1. Black Oxide Finish

A suitable surface treatment for use herein is black oxide finish. A black finish is produced by immersing the drill in a hot oxidizing salt solution. One such solution is FERROX-IDE 400™, available from Electrochemical Products, Inc. During this treatment, all grinding stresses are relieved to improve toughness of the drill. Black oxide finish is typically applied to drills used for drilling into free machining steels, low carbon steels, stainless steels, and ferrous metals. Black oxide finish may also be known in the industry as blue finish, or steam oxide finish.

2. Gold Finish

Another suitable surface treatment for use herein is gold finish, wherein gold denotes the color of the finish, not the elemental composition of the finish. A gold finish is produced by a low temperature heat treatment, wherein the drill is heated in an oven at about 500° for a time period from about 10 minutes to about 20 minutes. During this treatment all grinding stresses are relieved to improve toughness of the drill and a gold colored oxide forms on the surface. Gold oxide finish is typically applied to drills used for drilling into ferrous and non-ferrous metals where there is a tendency for chips to cling to the drill surface. Gold oxide finish may also be known in the industry as amber finish, bronze finish, or gold oxide finish.

3. Polished Finish

A suitable surface treatment for use herein is polished finish. A polished finish is produced by fine finish grinding of the drill surface. During the grinding, a smooth surface is created which results in decreased chip friction and loading. Polished finish is typically applied to drills used for drilling into ferrous and non-ferrous metals, wood, and plastic where there is a tendency for chips to cling to the drill surface. Polished finish may also be known in the industry as bright finish or silver finish.

4. Gray Finish

Another suitable surface treatment for use herein is gray finish. A gray finish is produced by shot blasting the drill surface with fine powdered glass. Such powdered glass is commonly available. During this treatment, surface stresses are reduced to improve endurance of the drill and improve work finish. Gray finish is typically applied to drills used for drilling into ferrous and non-ferrous metals, wood, and plastic where there is a tendency for chips to cling to the drill surface. Gray finish may also be known in the industry as white finish.

5. Titanium Nitride Coating

A suitable surface treatment for use herein is titanium nitride coating. A bright gold coating of titanium nitride (TiN) is produced by the physical vapor deposition (PVD) process. PVD involves placing a drill into a vacuumed reaction chamber which employs an electric field to generate high energy, (which translates into high temperature, i.e. ranging from about 200° C. to about 500° C.), wherein nitrogen and titanium vapor are introduced, which when both are in turn ionized, coating occurs. This process is described in more detail in "Coated Tools: Two Decades of Improving Productivity," by Al Clavel, published in *Cutting Tool Engineering*, February, 1989, at pages 68–70, and 73, which description is incorporated herein by reference. The coating is typically about 0.0001 inches thickness and is has about Rc8O hardness. It refracts heat and acts as a thermal barrier between the chip and the drill. TiN is typically applied to drills used for drilling into ferrous materials and non-ferrous metals below a hardness number on the Diamond Pyramid Hardness Numbers Scale of about 400 Vickers.

6. Titanium Carbonitride Coating

Another suitable surface treatment for use herein is titanium carbonitride coating. A gray multi-layered coating of titanium carbonitride (TiCN) is produced by the PVD process (described above). The coating is typically about 0.0001 inches thickness and is has about 4000 Vickers hardness. TiCN is typically applied to drills used for drilling into alloy steels, tool steels, and abrasive materials, such as cast iron and high silicon aluminum alloys.

7. Titanium Aluminum Nitride Coating

A suitable surface treatment for use herein is titanium aluminum nitride coating. A purple multi-layered coating of titanium aluminum nitride (TiAlN) is produced by the PVD process (described above). The coating is typically about 0.0001 inches thickness and has a hardness of about 2800 Vickers hardness. TiAlN is typically applied to drills used for drilling into titanium and nickel alloys, stainless steels, hard abrasive materials, and whenever excessive heat is generated on the cutting edge of a drill.

8. Aluminum Titanium Nitride Coating

Another suitable surface treatment for use herein is aluminum titanium nitride coating. A black multi-layered coating of aluminum titanium nitride (AlTiN) is produced by the PVD process (described above). The coating is typically about 0.0001 inches thickness and has a hardness of about 4400 Vickers hardness. AlTiN is typically applied to solid carbide drills used to machine hard abrasive materials and hardened steels. It is also applied to drills used for high speed machining and where higher temperatures are generated.

9. Zirconium Nitride Coating

A suitable surface treatment for use herein is zirconium nitride coating. A bright silver/gold colored coating of zirconium nitride (ZrN) is produced by the PVD process (described above). The coating is typically about 0.0001 inches thickness and has a hardness of about 3100 Vickers hardness. ZrN is typically applied to drills used for drilling into aluminum alloys, cast iron, high temperature alloys, stainless steels, non-ferrous metals, glass filled plastics, and wood.

What is claimed is:

1. A self-centering drill comprising:
   (a) shank, a body, and a cutting end, all formed integrally in the drill:
   (b) said body interposed between said shank said cutting end, said body having a pair of helical flutes and a corresponding pair of helical lands;
   (c) said cutting end including a substantially flat bottom section having primary cutting lips which are relief ground and are formed convex relative to said bottom, said primary cutting lips forming a primary point angle, measured by forming an angle that extends from the primary cutting lips and passes through the rotational axis in the body, and a helical crown having a helical crown point tip that extends from said bottom section, said helical crown point tip having self-centering cutting lips;
   (d) wherein the outside edges of said bottom section are chamfered to form secondary cutting lips which are radially relieved, said secondary cutting lips forming a secondary point angle, measure by forming an angle that extends from the secondary cutting lips and passes through the rotational axis in the body,
   (e) said primary point angle being greater than said secondary point angle.

2. A self-centering drill according to claim 1, wherein said cutting end has an "S"-shaped chisel edge.

3. A self-centering drill according to claim 2, wherein said "S"-shaped chisel edge has a chisel edge angle ranging from about 110° to about 120°.

4. A self-centering drill according to claim 3, wherein said chisel edge angle ranges from about 112° to about 118°.

5. A self-centering drill according to claim 1, wherein said primary point angle ranges from about 157° to about 174°.

6. A self-centering drill according to claim 5, wherein said primary point angle ranges from about 162° to about 172°.

7. A self-centering drill according to claim 1, wherein said secondary pant angle ranges from about 90° to about 125°.

8. A self-centering drill according to claim 7, wherein said secondary point angle ranges from about 98° to about 120°.

9. A self centering drill according to claim 1, wherein said drill comprises at least one material selected from the group consisting of carbon steel, tool steel, chrome vanadium tool steel, high speed steel, cobalt high speed steel, solid carbide, solid carbide mirograin, and mixtures thereof.

10. A self-centering drill according to claim 1, wherein said drill comprises a steel alloy, wherein said steel alloy comprises from about 0.3% to about 35%, by weight, of at least one element selected from the group consisting of carbon, molybdenum, chromium, vanadium, and mixtures thereof.

11. A self-centering drill according to claim 10, wherein said steel alloy further comprises from about 0.10% to 20%, by weight, of at least one element selected from the group consisting of tungsten, aluminum, cobalt, and mixtures thereof.

12. A self-centering drill according to claim 1, wherein said drill body is coated with at least one coating material selected from the group consisting of titanium nitride, titanium carbonitride, titanium aluminum nitride, aluminum titanium nitride, zirconium nitride, and mixtures thereof.

13. A self-centering drill according to claim 1, wherein said drill body is finished with a surface treatment selected from the group consisting of black oxide finish, gold finish, polished finish, and gray finish.

14. A self-centering drill according to claim 1, wherein said helical flutes have a prescribed helix angle from about 10° to about 40°.

15. A self-centering drill according to claim 14, wherein said helical flutes have a prescribed helix angle from about 15° to about 30°.

16. A self-centering drill according to claim 1, wherein said helical crown point tip has a height ranging from about $\frac{1}{32}$ inches to about $\frac{3}{32}$ inches.

17. A self-centering drill according to claim 1, having a web thickness ranging from about 11% to about 20% of the diameter of said self-centering drill.

18. A method of drilling comprising the steps of:
   (a) selecting a self-centering drill having a shank, body, and a cutting end, all formed integrally in the drill;
       (i) said body interposed between said shank and said cutting end, said body having a pair of helical flutes and a corresponding pair of helical lands;
       (ii) said cutting end including a substantially flat bottom section having primary cutting lips which are relief ground and are formed convex to said bottom, said primary cutting lips forming a primary point angle, measured by forming an angle that extends from the primary cutting lips and passes through the extends from said bottom section, said helical crown point tip having self-centering cutting lips;
       (iii) wherein the outside edges of said bottom section are chamfered to form secondary cutting lips which are radially relieved, said secondary cutting lips forming a secondary point angle, measured by forming an angle that extends from the secondary cutting lips and passes through the rotational axis in the body
       (iv) said primary point angle being greater than said secondary point angle; and
   (b) drilling at least one hole through at least one material selected from the group consisting of ferrous metals, non-ferrous metals, natural wood products, composite wood products, plastics, and layered combinations thereof.

19. A method of counterboring, comprising the steps of:
   (a) first, using a self-centering drill having a shank, a body, and a cutting end, all formed integrally in the drill,
       (i) said body interposed between said shank and said cutting end, said body having a pair of helical flutes and a corresponding pair of helical lands;

(ii) said cutting end including a substantially flat bottom section having primary cutting lips which are relief ground and are formed convex to said bottom, said primary cutting lips forming a primary point angle, measured by forming an angle that extends from the primary cutting lips and passes through the rotational axis in the body, and a helical crown having a helical crown point tip that extends from said bottom section, said helical crown point tip having self-centering cutting lips;

(iii) wherein the outside edges of said bottom section are chamfered to form secondary cutting lips which are radially relieved, said secondary cutting lips forming a secondary point angle, measured by forming an angle that extends from the secondary cutting lips and passes through the rotational axis in the body (iv) said primary point angle being greater than said secondary point angle; drilling a counterbore diameter to desired depth; and (b) second, using any drill a hole within said counterbore diameter for the body diameter of a screw.

* * * * *